(12) United States Patent
Smith

(10) Patent No.: US 12,313,188 B2
(45) Date of Patent: May 27, 2025

(54) VALVE ASSEMBLY WITH ADJUSTABLE SPACER AND NOISE REDUCTION

(71) Applicant: Johnson Controls Tyco IP Holdings LLP, Milwaukee, WI (US)

(72) Inventor: Damon Smith, Alto, GA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/407,747

(22) Filed: Jan. 9, 2024

(65) Prior Publication Data

US 2024/0229939 A1  Jul. 11, 2024

Related U.S. Application Data

(60) Provisional application No. 63/438,162, filed on Jan. 10, 2023.

(51) Int. Cl.
| | | |
|---|---|---|
| *F16K 5/10* | (2006.01) | |
| *F16K 5/16* | (2006.01) | |
| *F16K 17/30* | (2006.01) | |
| *F16K 47/02* | (2006.01) | |

(52) U.S. Cl.
CPC .............. *F16K 5/103* (2013.01); *F16K 5/161* (2013.01); *F16K 17/30* (2013.01); *F16K 47/02* (2013.01); *F16K 2200/301* (2021.08); *F16K 2200/304* (2021.08); *Y10T 137/3367* (2015.04); *Y10T 137/7869* (2015.04)

(58) Field of Classification Search
CPC .... F16K 17/30; F16K 2200/304; F24F 11/75; Y10T 137/3367; Y10T 137/7869
See application file for complete search history.

(56) References Cited

U.S. PATENT DOCUMENTS

| | | | | |
|---|---|---|---|---|
| 1,520,575 | A * | 12/1924 | Kandarian | ................ F01L 1/46 251/337 |
| 3,204,664 | A * | 9/1965 | Gorchev | .................. F24F 11/75 138/46 |
| 3,255,963 | A * | 6/1966 | Gorchev | ............. G05D 7/0133 138/46 |
| 4,456,029 | A * | 6/1984 | McCrum | ................. F16K 17/26 137/516.25 |
| 11,448,420 | B2 | 9/2022 | Scholten | |
| 2002/0162589 | A1* | 11/2002 | Lorch | ..................... F24F 13/24 137/517 |
| 2012/0270493 | A1* | 10/2012 | Oliver | ..................... F24F 13/24 454/236 |
| 2014/0284508 | A1* | 9/2014 | Nesbitt | .................... F24F 11/75 251/124 |
| 2016/0010752 | A1* | 1/2016 | Boisvert | ............. G05D 7/0133 251/333 |

* cited by examiner

*Primary Examiner* — Robert K Arundale
(74) *Attorney, Agent, or Firm* — Foley & Lardner LLP

(57) ABSTRACT

A valve assembly, includes a valve body having an inlet portion, an outlet portion, and a constriction portion; a shaft positioned within the valve body and extending along a longitudinal axis of the valve body; a cone provided within the inlet portion and configured to move along the shaft; a spring configured to bias the cone away from the constriction and positioned between a first piston fixed to the cone and a second piston fixed to the shaft; and an adjustable spacer positioned between a fixed position on the shaft and the second piston. The adjustable spacer is adjustable in length to change an effective length of the adjustable spacer and change a position of the second piston on the shaft.

20 Claims, 8 Drawing Sheets

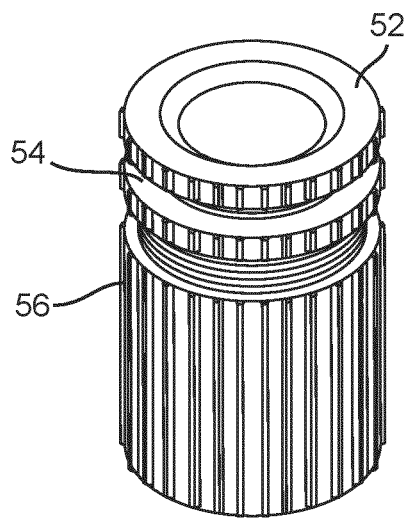
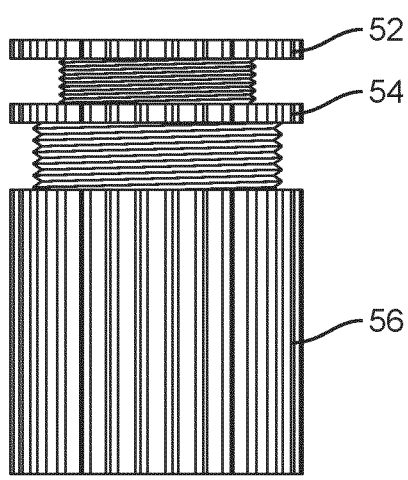
FIG. 6  FIG. 7
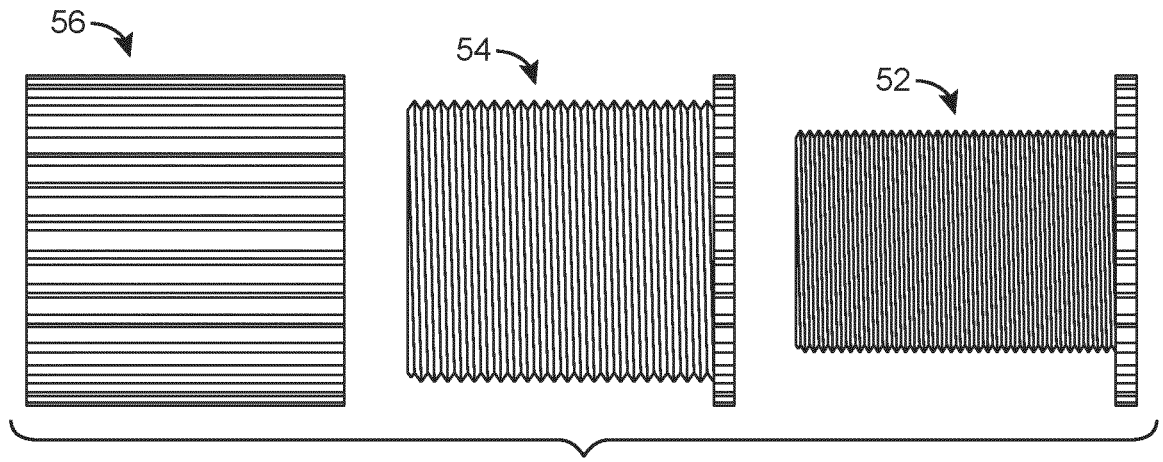
FIG. 8
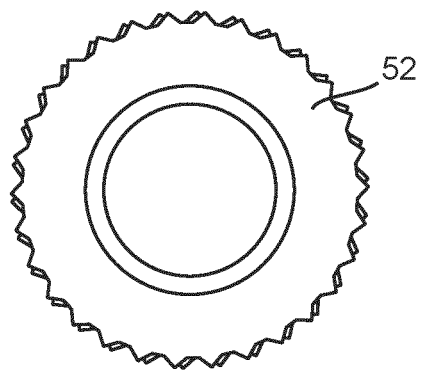
FIG. 9

VALVE ASSEMBLY WITH ADJUSTABLE SPACER AND NOISE REDUCTION

CROSS REFERENCE TO RELATED APPLICATIONS

This application claims the benefit of and priority to U.S. Provisional Patent Application No. 63/438,162, filed on Jan. 10, 2023, the entirety of which is incorporated by reference herein.

BACKGROUND

The present disclosure relates generally to valves, and more specifically, to air valves such as venture air valves that control the flow rate of air or other gases.

SUMMARY

One embodiment relates to a valve assembly, including a valve body having an inlet portion, an outlet portion, and a constriction portion; a shaft positioned within the valve body and extending along a longitudinal axis of the valve body; a cone provided within the inlet portion and configured to move along the shaft; a spring configured to bias the cone away from the constriction portion and positioned between a first piston fixed to the cone and a second piston fixed to the shaft; and an adjustable spacer positioned between a fixed position on the shaft and the second piston. The adjustable spacer is adjustable in length to change an effective length of the adjustable spacer and change a position of the second piston on the shaft.

Another embodiment relates to a valve assembly, including a valve body having an inlet portion, an outlet portion, and a constriction portion; a shaft positioned within the valve body and extending along a longitudinal axis of the valve body; a cone provided within the inlet portion and configured to move along the shaft. The cone includes an outwardmost radial periphery having a number of projections extending about the periphery.

Another embodiments relates to a valve assembly. The valve assembly includes a valve body comprising an inlet portion, an outlet portion, and a constriction portion, a shaft positioned within the valve body and extending along a longitudinal axis of the valve body, a cone disposed within the inlet portion and configured to move along the shaft; a spring positioned between a first piston fixed to the cone and a second piston fixed to the shaft, and an adjustable spacer positioned between a fixed position on the shaft and the second piston. The adjustable spacer is configured to be adjustable to change a position of the second piston on the shaft. In some embodiments, the cone includes an outwardmost radial periphery including a number of projections extending about the periphery. In some embodiments, the adjustable spacer is configured to be adjustable in length to change an effective length of the adjustable spacer and thereby change a position of the second piston on the shaft. In some embodiments, the first component threadingly engages the second component. In some embodiments, rotation of the first component relative to the second component changes the effective length of the adjustable spacer.

In some embodiments, the adjustable spacer includes s a third component movable relative to the second component to change the effective length of the adjustable spacer.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 6-9 are various schematic drawing views of an adjustable spacer according to one embodiment.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, various embodiments disclosed herein relate to air valves, and more specifically, venture air valves configured to provide a desired volumetric flow of air through a duct and/or to a space. Venturi air valves may include a valve body or body portion defining an inlet, a constructed portion, and an outlet. A cone may be provided in the inlet and move within the valve body to control the volumetric flow rate of air (or another gas) flowing though the valve.

In some embodiments, the valve is a pressure independent flow valve that utilizes a cone positioned on a shaft. The position of the cone defines the available flow area of an orifice. A spring is mounted on the shaft and coupled to the cone, such that as the static pressure within, for example, a duct coupled to the valve, increases, the spring is compressed and the cone moves along the shaft, changing the orifice size. During manufacturing and/or maintenance of the valve (e.g., during initial tuning, characterizing, etc.), it may be necessary to "tune" the valve, by adjusting the initial position and/or precompression of the spring to provide a desired flow control characteristic. As such, various embodiments herein are directed to an adjustable length spacer that is mountable on the shaft and configured to engage a piston coupled to the spring to enable adjustment of the spring compression and the linear travel of the cone. The spacer may include two or more components that are threaded or otherwise movable with respect to each other such that by rotating or otherwise moving the spacer components relative to each other, the effective length of the spacer changes. Once a desired length of the spacer is determined and the spacer is set to a desired effective length, the spacer may be permanently or semi-permanently fixed in place (e.g., fixed at a desired effective length).

Various other embodiments herein are directed to a cone having a peripheral edge configured to reduce noise relative to conventional cone designs. As air passes by the cone, turbulence from the flow of the air may create noise within the valve. In order to reduce the sound output from this flow of air, the outer edge or periphery of the cone may be provided with serrations or projections (e.g., formed by slits, cuts, or similar features, as discussed in greater detail below). The projections may be provided on the cone itself, or as part of a separate gasket or other member coupled to a portion of the cone and in which the serrations or projections are formed.

Figure 1:
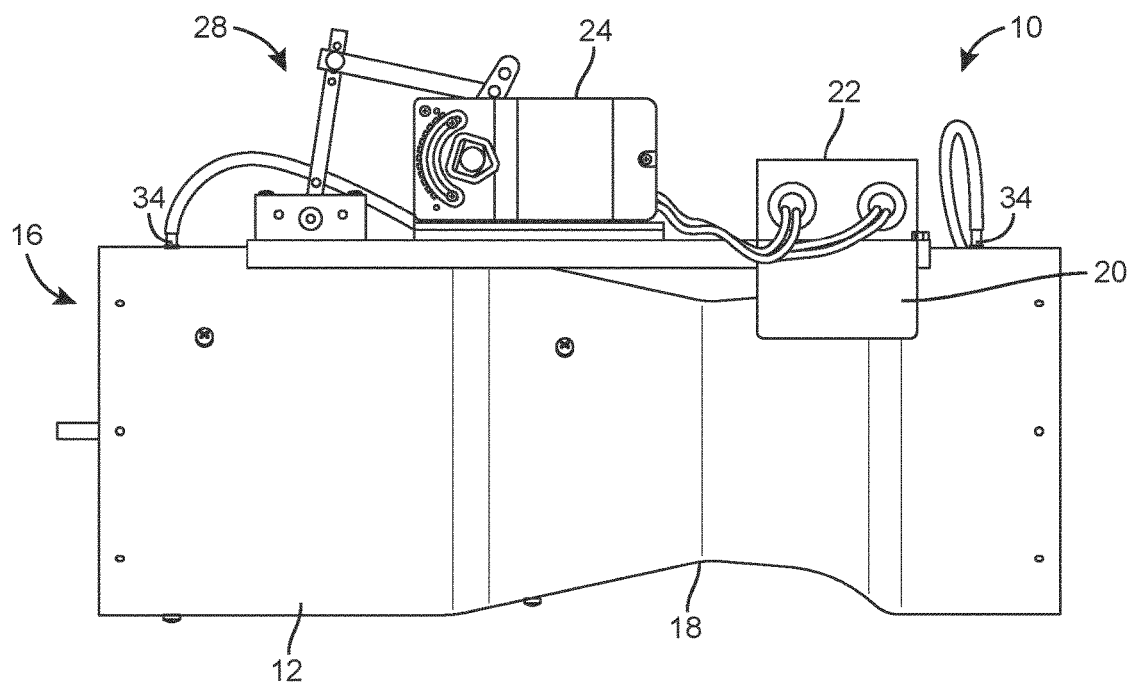
FIG. 1 is a side view schematic drawing of a valve assembly according to one embodiment.
Figure 2:
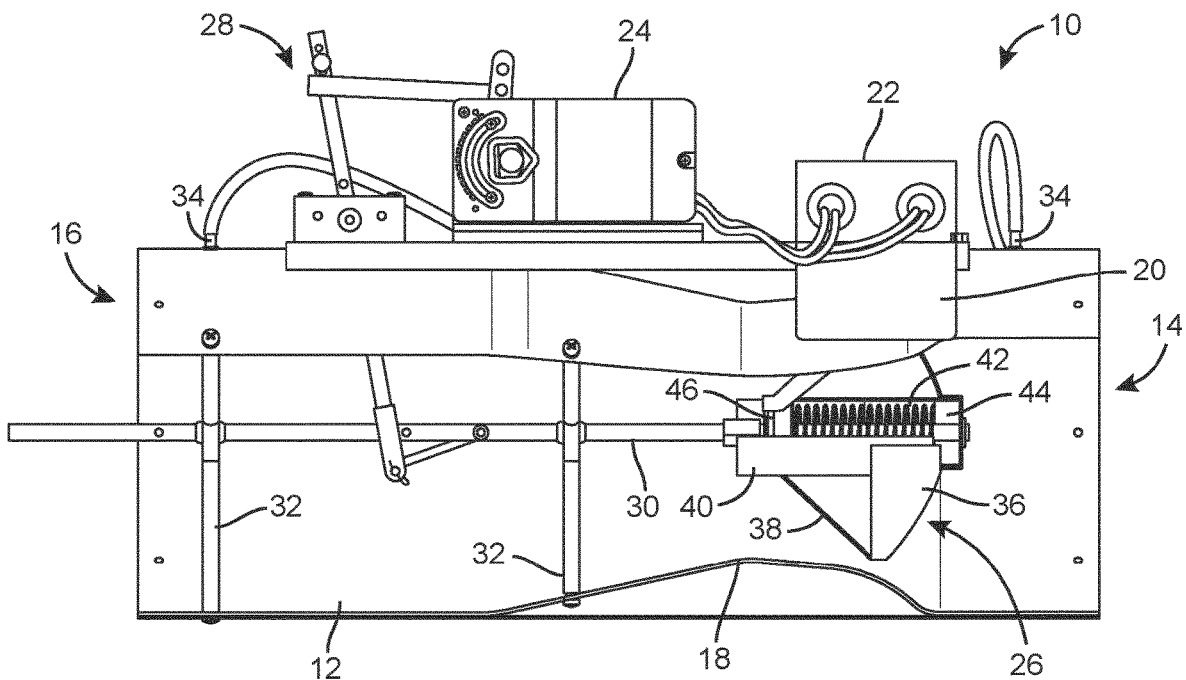
FIG. 2 is a cross-section view schematic drawing of the valve assembly of FIG. 1 according to one embodiment.
Figure 3:
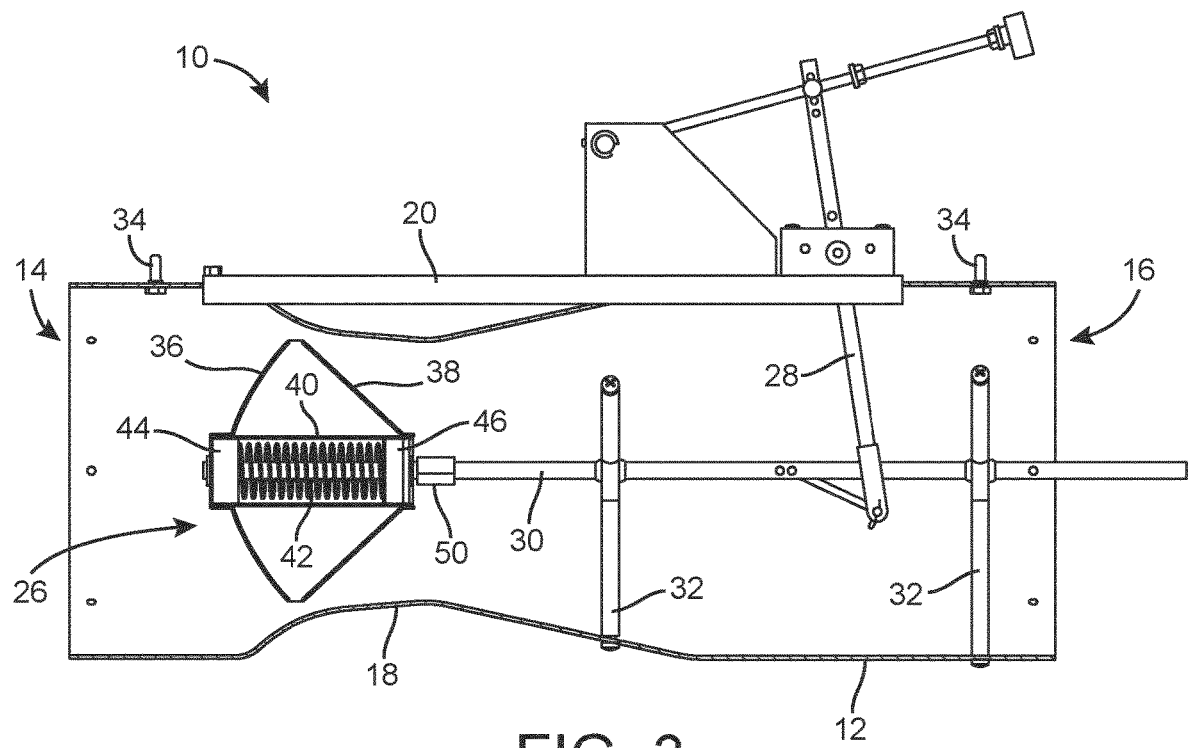
FIG. 3 is another cross-section view schematic drawing of a valve assembly according to one embodiment.

Referring now to FIGS. 1-3, a valve assembly 10 (e.g., an air valve, a venturi valve, a constant volume air valve, etc.) is shown according to an embodiment. Valve assembly 10 includes a valve body 12 through which air or other gas flows (e.g., right to left in FIGS. 1 and 2, left to right in FIG. 3). The valve body 12 defines an inlet 14, an outlet 16, and a constriction 18 (e.g., a choke, etc.) positioned between the inlet 14 and the outlet 16. A mounting bracket 20 is mounted to the valve body 12 and used to mount various components to the valve body 12. For example, as shown in FIG. 1, a controller 22 and an actuator 24 are coupled to the mounting bracket 20. The controller 22 is usable to control operation of the actuator 24, which in turn is usable to control a position of a cone 26 with the valve body 12. The actuator 24 is coupled to the 26 cone via a linkage 28 and a cone shaft 30. The cone 26 is mounted to the cone shaft 30, which is movable along the length of the valve body 12 via manipulation of the linkage 28 to change the flow characteristics of the valve assembly 10. One or more struts 32 may be provided to provide support to the cone shaft 30. Furthermore, pressure sensors 34 may be provided upstream and downstream from the constriction 18 such that upstream and downstream pressure values may be used to configure the valve assembly 10.

Referring to FIGS. 2-3, the cone 26 includes a front portion 36, a rear portion 38, and an inner housing 40. A spring 42 (e.g., a coil spring, etc.) is positioned with the inner housing 40 and between a first piston 44 (e.g., a first disk, cylinder, etc.) and a second piston 46 (e.g., a second disk, cylinder, etc.). The first piston 44 is fixed in position relative to the inner housing 40, but is longitudinally movable along the cone shaft 30 (e.g., such that the cone shaft 30 can slide longitudinally relative to the inner housing 40 and the first piston 44. The second piston 46 is fixed in position relative to the cone shaft 30, but longitudinally movable within and relative to the inner housing 40.

In one embodiment, an adjustable spacer 50 (see FIG. 3) is mounted on the cone shaft 30 and adjacent the second piston 46. The adjustable spacer 50 has an adjustable effective length, such that as the length of the spacer 50 is increased, the spacer 50 forces the second piston 46 toward the first piston 44, thereby compressing the spring 42. In use, as the static pressure upstream from the cone 26 increases, the pressure will tend to force the cone 26 (e.g., front portion 36 and rear portion 38) to move toward the constriction 18 of the valve body 12, thereby decreasing the orifice area. As the cone 26 moves, the cone shaft 30, spacer 50, and second piston 46 remain in position. The front portion 36 of the cone 26, the rear portion 38 of the cone 26, the first piston 44, and the inner housing 40 move relative to the cone shaft 30 and the second piston 46, thereby compressing the spring 42 until the spring force is sufficient to resist further movement of the cone 26. As the static pressure decreases, the spring force tends to force the cone 26 to move away from the constriction 18 of the valve body 12, thereby increasing the orifice area and decompressing the spring 42.

In one embodiment, the front portion 36 and rear portion 38 of the cone 26 are shaped to facilitate airflow through the valve assembly 10. For example, the front portion 36 may have a rounded or partially spherical contour extending radially outward from the inner housing 40 and sweeping back in the direction of airflow. The rear portion 38 provides support to the front portion 36 and extends from the outer edge or periphery of the front portion 36 and radially inward to the inner housing 40. The front and rear portions 36, 38 may be made of aluminum or any other suitable material.

In one embodiment, the inner housing 40 is generally cylindrical or tubular in shape, and is sized to accommodate the spring 42 and the first and second pistons 44, 46. The inner housing 40 and first and second pistons 44, 46 may be made of any suitable material, including fiberglass, polymers, etc.

Referring now to FIGS. 4-9, the adjustable spacer 50 is shown in greater detail according to an embodiment. The spacer 50 includes a first portion 52, a second portion 54, and a third portion 56. The first portion 52 includes an externally threaded cylindrical portion and a flange at one end. The interior of the first portion 52 is configured to provide a close fit over the cone shaft 30. The second portion 54 includes an interior and exterior threaded cylindrical portion and a flange at one end. The interior threads of the second portion 54 match the exterior threads of the first portion 52, such that the first portion 52 can be threadingly received within or by the second portion 54. The third portion 56 includes an interior threaded cylindrical portion. The third portion 56 may have a smooth exterior surface. Alternatively, the third portion 56 may have a textured or shaped outer surface configured to facilitate grasping and/or turning by a user, a tool, etc.

The effective length of the spacer 50 is defined by one end of the third portion 56 and the flanged end of the first portion 52. The spacer 50 is configured such that the effective length of the spacer 50 is adjustable by rotating the first portion 52 relative to the second portion 54 and/or rotating the second portion 54 relative to the third portion 56. As such, by simple manipulation of the spacer portions 52, 54, 56 relative to one another, the effective length of the spacer 50 can be tuned for a particular valve application.

Figure 4:
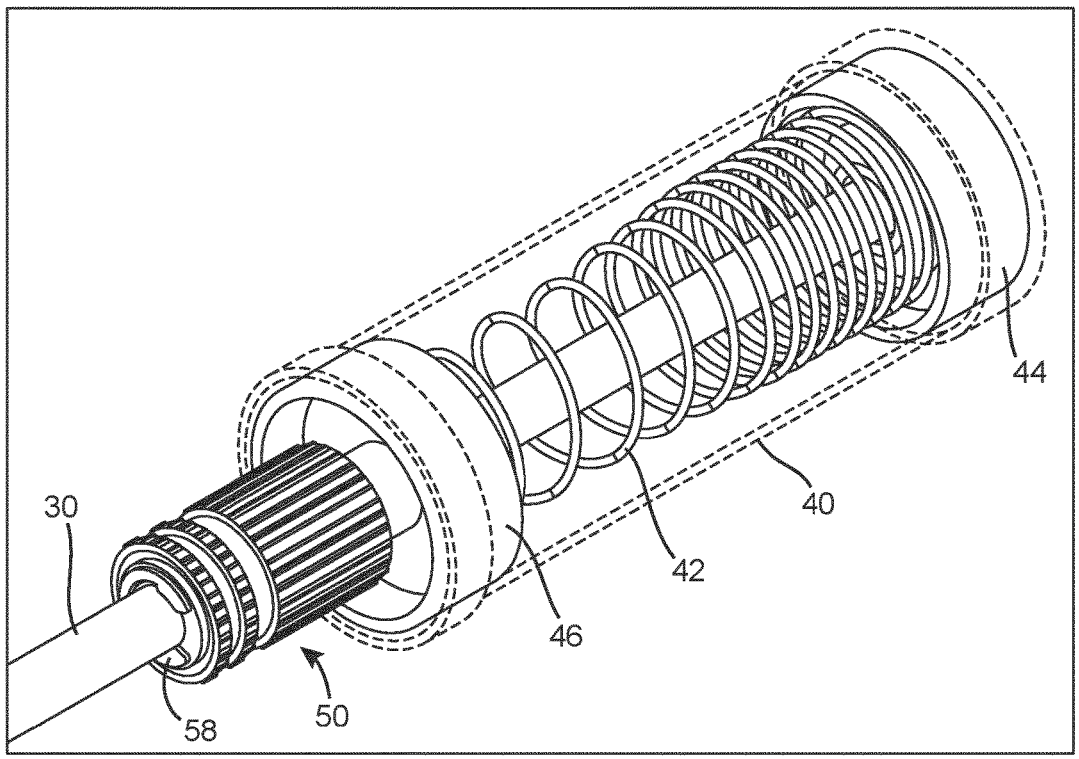
FIG. 4 is a perspective view schematic drawing of a portion of a valve assembly illustrating an adjustable spacer according to one embodiment.
Figure 5:
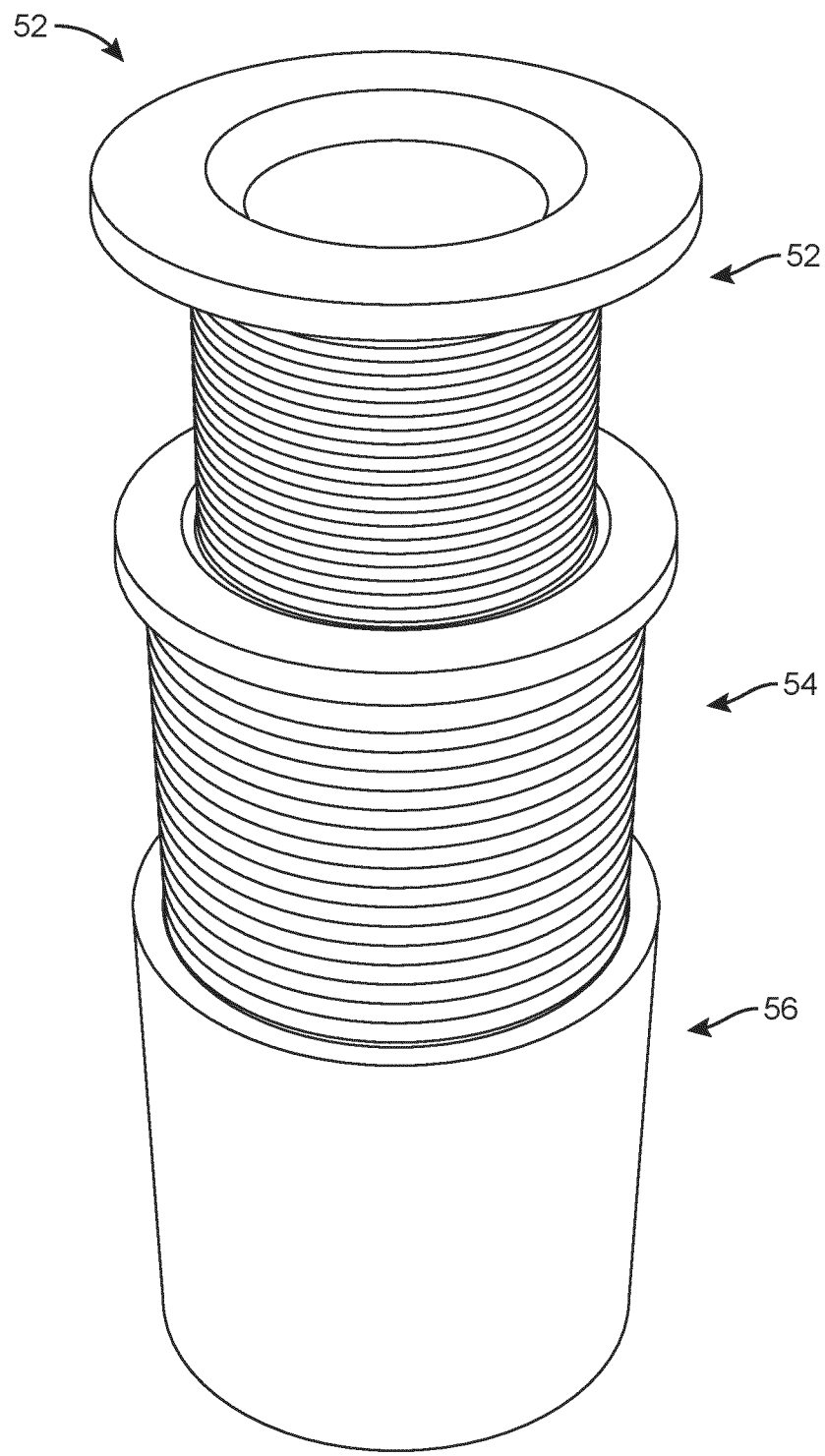
FIG. 5 is a front perspective schematic drawing view of an adjustable spacer according to one embodiment.
Figure 10:
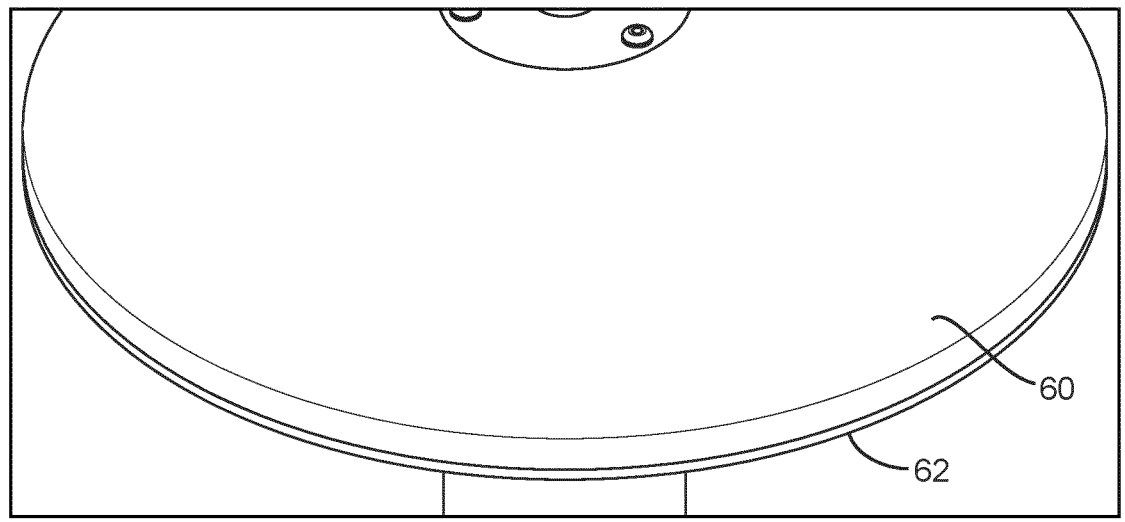
FIG. 10 is a perspective view schematic drawing of a portion of a front portion of a cone assembly according to one embodiment.
Figure 11:
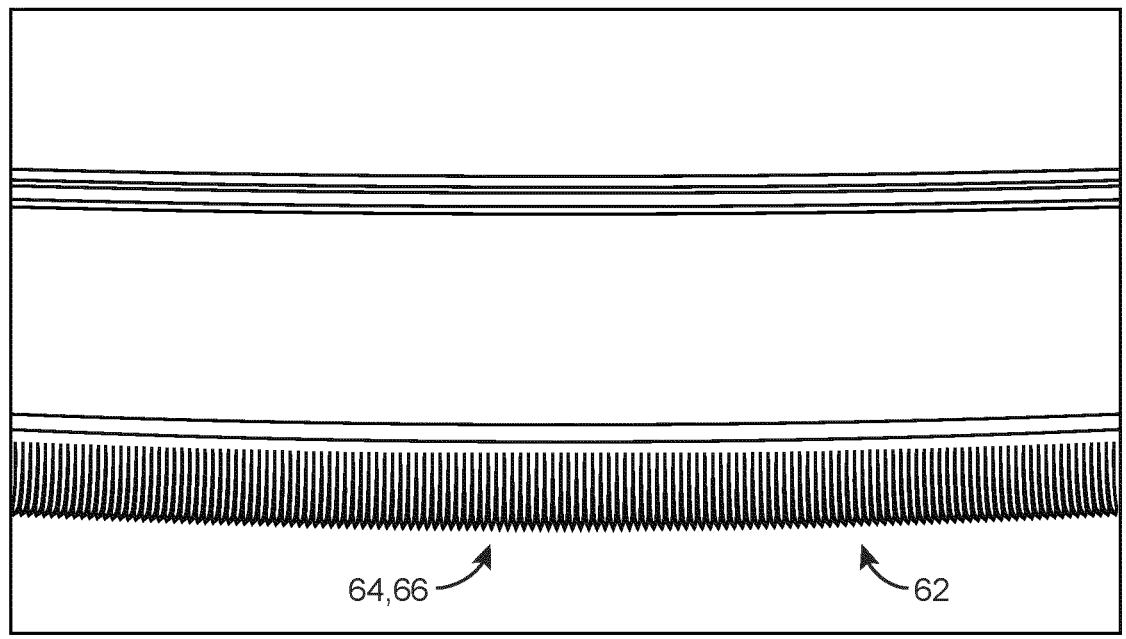
FIG. 11 is a perspective view schematic drawing of a portion of a gasket according to one embodiment.
Figure 12:
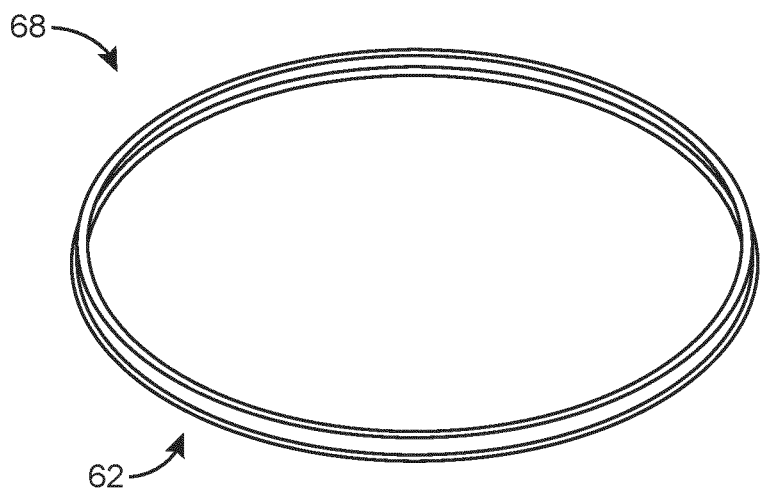
FIGS. 12-17 are various schematic drawing views of a gasket according to one embodiment.
Figure 13:
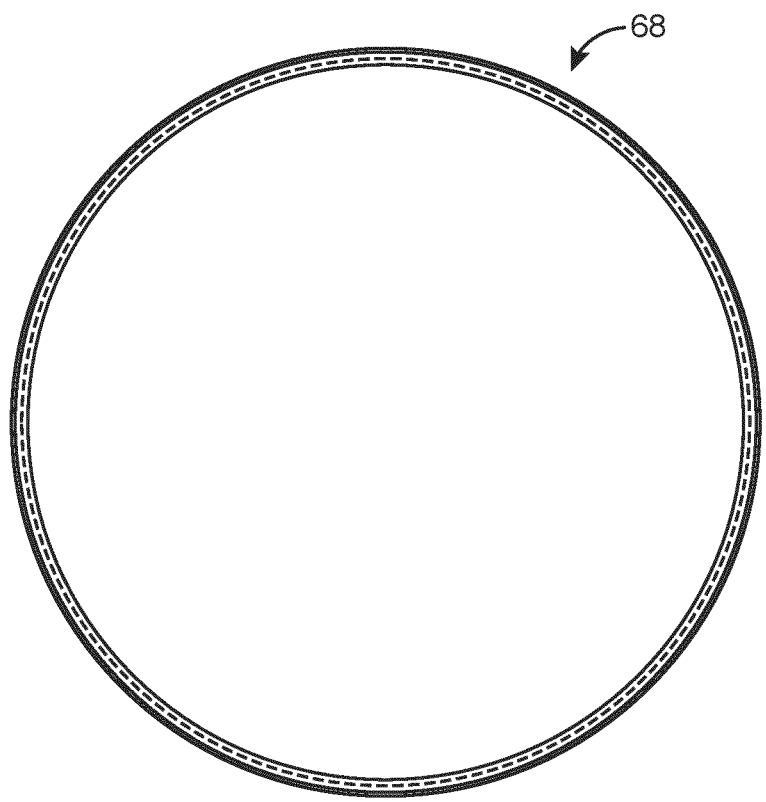
Figure 14:
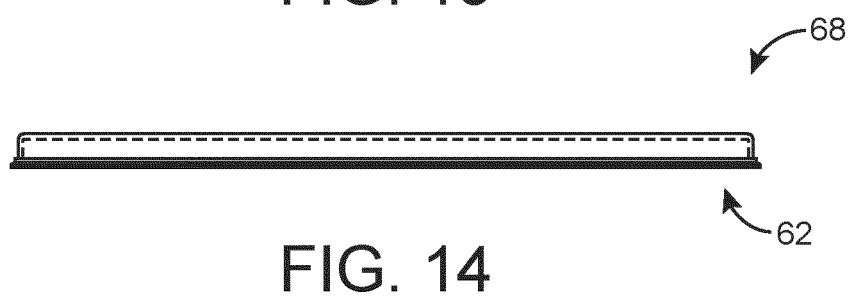
Figure 15:
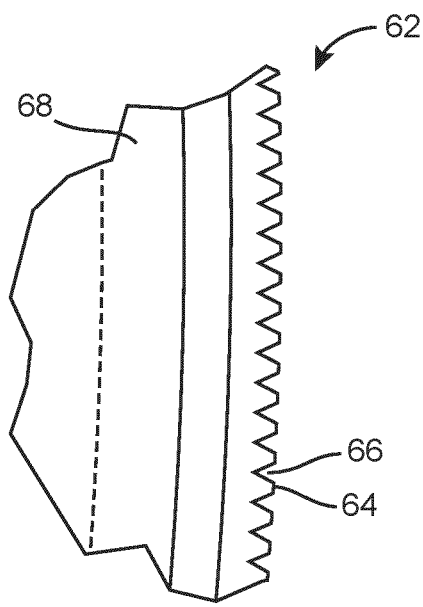
Figure 16:
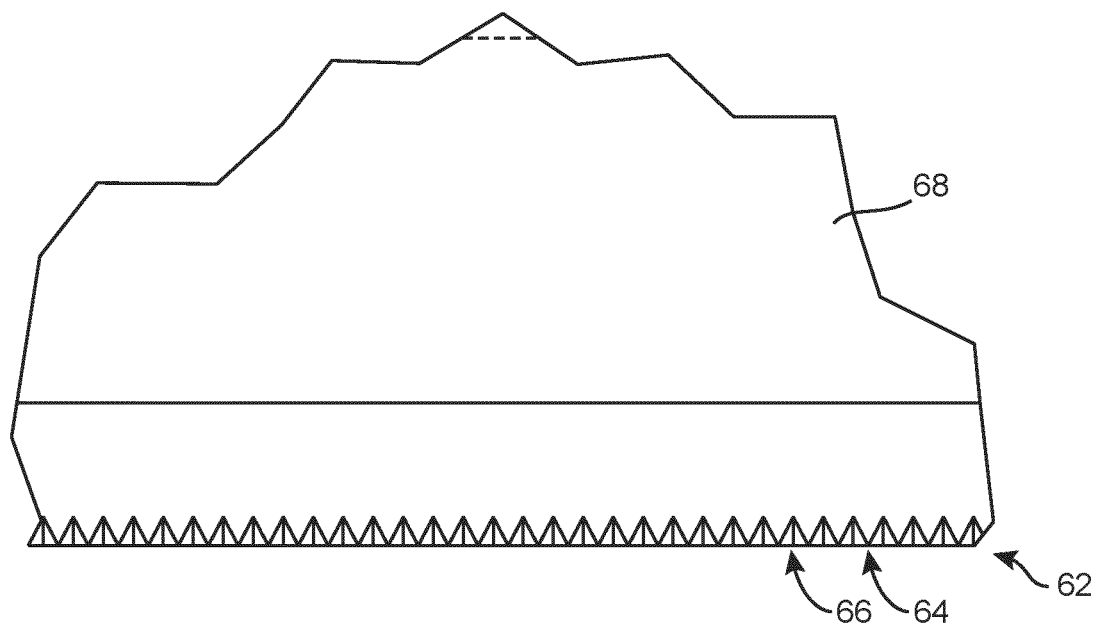
Figure 17:
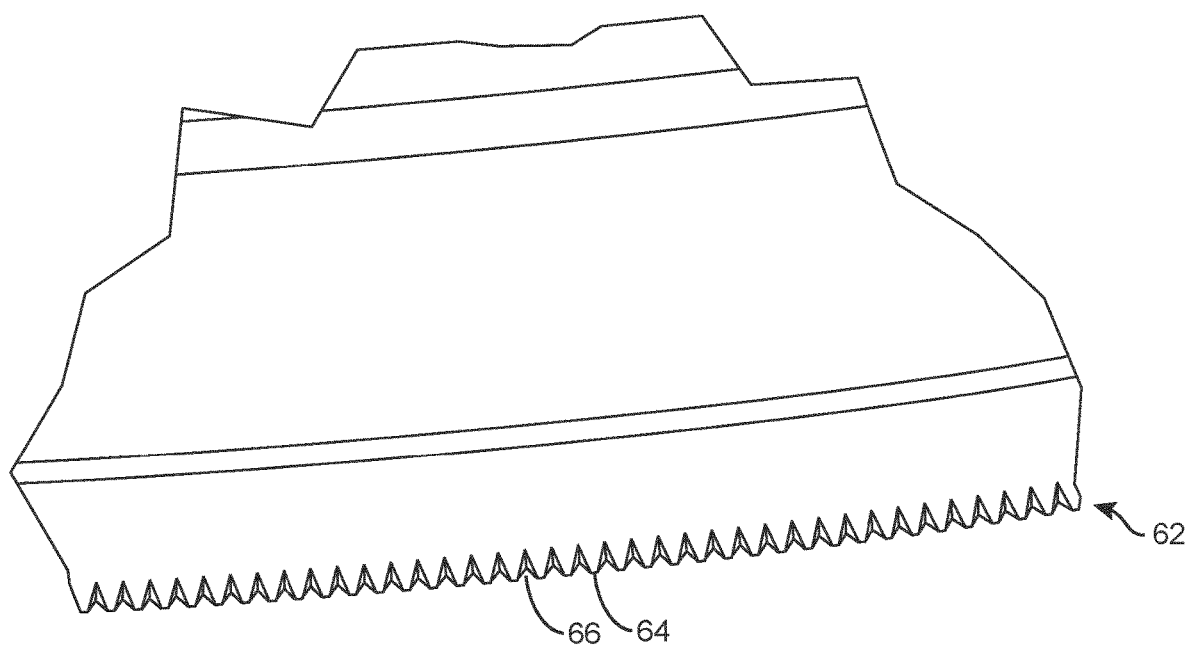

Referring to FIG. 4, the spacer 50 is maintained in position along the cone shaft 30 by a retaining ring 58 on one side, and by the second piston 46 on the opposite side. A washer, additional spacer, or other component (not shown in FIG. 4) may be positioned between the spacer and the second piston). As can be seen in FIG. 4, by increasing the effective length of the spacer 50, the distance between the second piston 46 (which is slidable within the inner housing 40) and the first piston 44 (which is fixed relative to the inner housing 40) is decreased, thereby compressing the spring 42. Likewise, shortening the spacer 50 results in a decrease in the distance between the second piston 46 and the first piston 44, thereby allowing the spring 42 to decompress.

In some embodiments, once a desired length for the adjustable spacer 50 is determined, the spacer 50 may be permanently fixed in position (e.g., at a desired effective length). Any suitable method of fixing the spacer 50 may be used, including thermal or chemical fusing or welding, pins, rivets, etc. Alternatively, a semi-permanent fixing may be utilized to enable later adjustments.

As shown in FIGS. 4-9, in one embodiment the adjustable spacer 50 includes three portions 52, 54, 56 that are adjustable relative to one another. According to various other embodiments, any number of portions or components may be utilized to provide a desired amount of adjustability to the spacer 50 (e.g., 2, 4, more than 4, etc.). The spacer 50 may provide adjustment of the effective length of approximately 0.5 inches, 1 inch, or another suitable adjustment amount. In some embodiments, the spacer 50 is adjustable between a shortest effective length of approximately 1 inch and a longest effective length of approximately 2.5 inches. Other adjustment lengths may be possible according to various alternative embodiments.

Providing an adjustable spacer such as the spacer 50 described herein may enable adjustment or tuning of the precompression of the spring 42 in the cone 26 of the valve assembly 10 without requiring dismounting and/or disassembling the valve assembly 10, which may be required during tuning of more traditional valve assemblies. Additionally, providing a spacer such as spacer 50 with adjustable portions or components such as those described herein may enable a finer degree of control and more precise adjustments than other methods.

Referring now to FIGS. 10-17, in some embodiments, the cone 26 may include a serrated or similarly shaped outer edge. The front portion 36 of the cone 26 includes a generally curved front surface 60 that faces the oncoming flow of air. The front surface 60 directs the air toward the outer edge 62 of the front portion 36 of the cone 26. As the air passes over the outer edge 62 of the cone 26, the air passes past projections 64 (e.g., serrations, etc.) and slits 66 in the outer edge 62, which act to reduce the sound output (e.g., decibel level) of the air passing the cone 26.

As shown in FIGS. 11-16, the projections 64 and slits 66 may be formed around an entire circumference of the outer edge 62 of the cone 26 (e.g., a trailing edge of the outer circumferential portion of the cone). In one embodiment, the outer edge 62 includes notches or slits 66 (e.g., V-shaped notches) that form generally V-shaped projections 64. The bottom of the "V" may come to a substantial point, or alternatively may form a flat bottom to the "V" (for either or both of the projections and slits) In one embodiment, the projections 64 are of the same size and shape and evenly distributed about the circumference of the outer edge 62 of the cone 26. In other embodiment, the projections 64 may be of different shapes and/or may be spaced unevenly about the circumference of the outer edge 62 of the cone 26. The projections 64 may have a widest portion of between about 0.01 inch and 0.04 inch, and be similar in length. For example, in one embodiment, the base of each projection 64 is about 0.02 inch wide, and the length of each projection 64 is about 0.02 inches. According to various other embodiments other dimensions for the width and height of the projections 64 may be used.

In some embodiments, the projections 64 extend radially outward. In other embodiments, the projections 64 extend longitudinally back in the direction of air flow. In further embodiments, the projections 64 extend partially radially outward and partially back in the direction of flow. For example, the projections 64 may extend in a direction that generally coincides with the front surface 60 of the front portion 36 of the cone 26 (e.g., swept back at an angle relative to the longitudinal axis of the valve assembly 10).

In one embodiment, the projections 64 are integrally formed as part of the cone 26 (e.g., formed in the same piece of material that forms the front portion 36 of the cone 26). For example, the projections 64 may be formed in a piece of aluminum or other metal. In other embodiments, the projections 64 may be formed in a gasket 68 (e.g., a ring, etc.) that extends around the circumference of the cone 26 and is a separate component from the front portion 36 of the cone 26. An example gasket 68 is shown as the gasket illustrated in FIGS. 12-17. The gasket 68 may be formed of a silicone, rubber, or any other suitable material.

Providing serrations or projections on the trailing outer edge of the cone may reduce the sound output resulting from airflow past the cone of the valve, resulting in a quieter operation of the valve and less disturbance to personnel in proximity to the valve.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the valve assembly as shown in the various exemplary embodiments is illustrative only. Additionally, any element disclosed in one embodiment may be incorporated or utilized with any other embodiment disclosed herein. For example, the gasket of the embodiment shown in at least FIGS. 12-17 may be incorporated in the valve assemblies of the embodiments shown in at least FIGS. 1-3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A valve assembly, comprising:
a valve body comprising an inlet portion, an outlet portion, and a constriction portion;
a shaft positioned within the valve body and extending along a longitudinal axis of the valve body;
a cone provided within the inlet portion and configured to move along the shaft;
a spring configured to bias the cone away from the constriction portion and positioned between a first piston fixed to the cone and a second piston fixed to the shaft; and
an adjustable spacer positioned between a fixed position on the shaft and the second piston, the adjustable spacer configured to be adjustable in length to change an effective length of the adjustable spacer and thereby change a position of the second piston on the shaft.

2. The valve assembly of claim 1, wherein the adjustable spacer comprises a first component movable relative to a second component to change the effective length of the adjustable spacer.

3. The valve assembly of claim 2, wherein the first component threadingly engages the second component.

4. The valve assembly of claim 3, wherein rotation of the first component relative to the second component changes the effective length of the adjustable spacer.

5. The valve assembly of claim 2, wherein the adjustable spacer comprises a third component movable relative to the second component to change the effective length of the adjustable spacer.

6. The valve assembly of claim 5, wherein the first component threadingly engages the second component, and the second component threadingly engages the third component.

7. The valve assembly of claim 1, further comprising a retaining member coupled to the shaft and configured to define the fixed position on the shaft and retain one end of the adjustable spacer at the fixed position.

8. The valve assembly of claim 1, wherein the adjustable spacer is configured to be fixed in a permanent position after being adjusted to have a desired effective length.

9. A valve assembly, comprising:
a valve body comprising an inlet portion, an outlet portion, and a constriction portion;
a shaft positioned within the valve body and extending along a longitudinal axis of the valve body;
a conical element disposed within the inlet portion and configured to move along the shaft;
a spring positioned between a first piston fixed to the conical element and a second piston fixed to the shaft; and
an adjustable spacer positioned between a fixed position on the shaft and the second piston, the adjustable spacer configured to be adjustable to change a position of the second piston on the shaft, the adjustable spacer configured to be adjustable in length to change an effective length of the adjustable spacer and thereby change the position of the second piston on the shaft.

10. The valve assembly of claim 9, wherein the conical element comprises an outwardmost radial periphery comprising a plurality of projections extending about the periphery.

11. The valve assembly of claim 9, wherein the adjustable spacer comprises a first component movable relative to a second component to change the effective length of the adjustable spacer.

12. The valve assembly of claim 9, wherein the adjustable spacer comprises a first component movable relative to a second component to change the effective length of the adjustable spacer, wherein the first component threadingly engages the second component.

13. The valve assembly of claim 12, wherein rotation of the first component relative to the second component changes the effective length of the adjustable spacer.

14. The valve assembly of claim 12, wherein the adjustable spacer comprises a third component movable relative to the second component to change the effective length of the adjustable spacer.

15. A valve assembly, comprising:
a valve body comprising an inlet portion, an outlet portion, and a constriction portion;
a shaft positioned within the valve body and extending along a longitudinal axis of the valve body;
a cone provided within the inlet portion and configured to move along the shaft;
a spring configured to bias the cone away from the constriction portion and positioned between a first piston fixed to the cone and a second piston fixed to the shaft; and
an adjustable spacer positioned between a fixed position on the shaft and the second piston, the adjustable spacer configured to be disposed about the shaft and to be adjustable in length to change an effective length of the adjustable spacer and thereby change a position of the second piston on the shaft.

16. The valve assembly of claim 15, wherein the adjustable spacer comprises a first component movable relative to a second component to change the effective length of the adjustable spacer.

17. The valve assembly of claim 16, wherein the first component threadingly engages the second component.

18. The valve assembly of claim 17, wherein rotation of the first component relative to the second component changes the effective length of the adjustable spacer.

19. The valve assembly of claim 16, wherein the adjustable spacer comprises a third component movable relative to the second component to change the effective length of the adjustable spacer.

20. The valve assembly of claim 19, wherein the adjustable spacer is configured to be fixed in a permanent position after being adjusted to have a desired effective length.

* * * * *